July 14, 1942.  R. NEUMEISTER ET AL  2,289,673
ELECTRIC MOTOR
Filed May 10, 1939  2 Sheets-Sheet 1
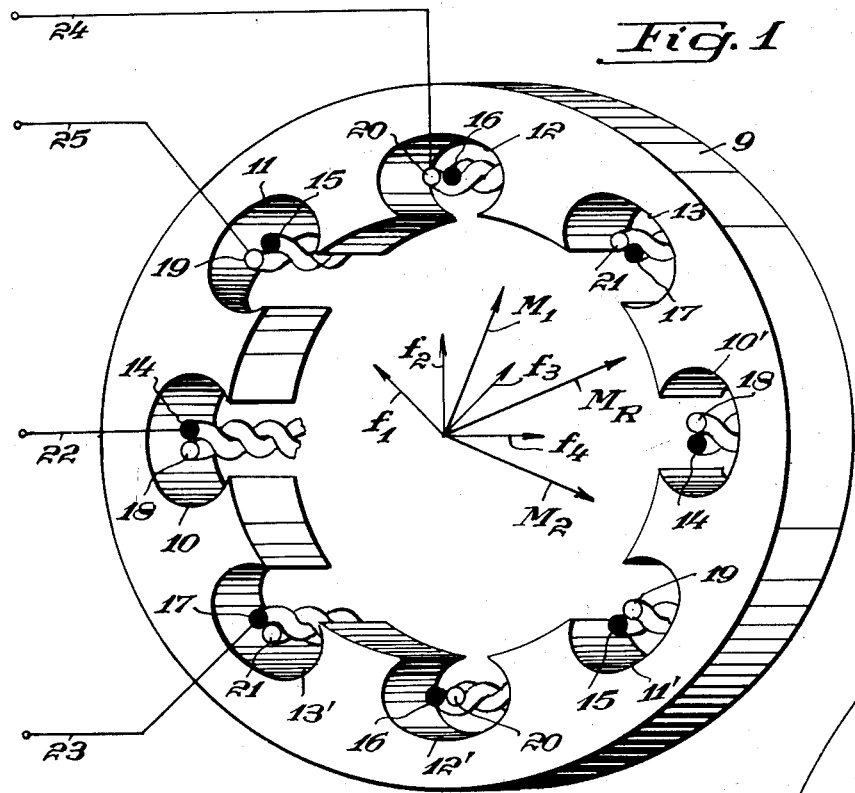
Fig. 1
Fig. 2
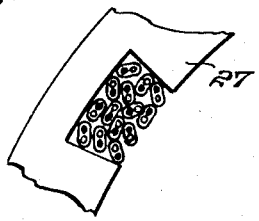
Fig. 4
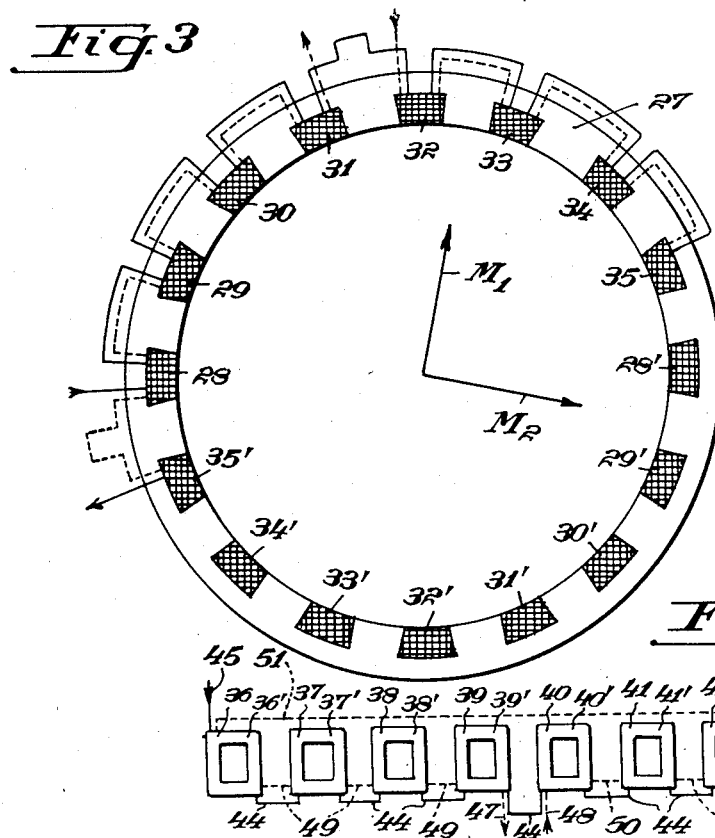
Fig. 3
Fig. 5
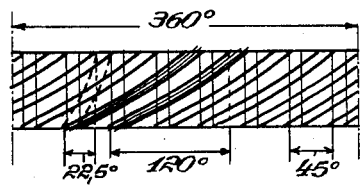
Fig. 6
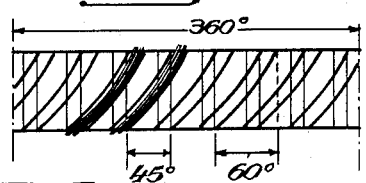
Fig. 7
INVENTORS
Rudolf Neumeister
Heinz Grosskans
BY Stephen Arstvik
ATTORNEY July 14, 1942. R. NEUMEISTER ET AL 2,289,673
ELECTRIC MOTOR
Filed May 10, 1939 2 Sheets-Sheet 2

INVENTORS.
Rudolf Neumeister
Heinz Grosshans
BY Stephen Cerstvik
ATTORNEY.

Patented July 14, 1942

2,289,673

UNITED STATES PATENT OFFICE 2,289,673

ELECTRIC MOTOR

Rudolf Neumeister, Berlin, and Heinz Grosshans, Blankenfelde, near Berlin, Germany, assignors to Siemens Apparate und Maschinen Gesellschaft mit beschränkter Haftung, Berlin, Germany, a corporation of Germany Application May 10, 1939, Serial No. 272,902
In Germany January 22, 1937

8 Claims. (Cl. 172—36)

This invention relates to electric motors, and more particularly to an arrangement of the windings, and winding slots, of electric motors.

It is known that a rotating magnetic field for an electric motor may be created by two phase or polyphase alternating current which passes through two or more windings, the axes of which are angularly disposed relative to one another in a predetermined manner. Rotating field arrangements of this type are characterized by great electrical and magnetic symmetry. However, quite frequently it is necessary to create a rotating field through electric impulses, i. e. by irregularly acting current or voltage changes. In electric remote transmission devices, for example, a transmitter rotor can be adjusted to a given angular position which will produce current impulses in a receiver to create therein a rotating magnetic field having a direction which causes a receiver rotor to assume a corresponding position to that of the transmitter rotor. Rotating magnetic fields which are produced by electric impulses and which act in winding arrangements heretofore proposed do not possess a uniform behavior in all phases of the transmission period. The torques which act upon the receiver rotor vary with the angle of torsion. The iron circuit or iron contact, that is the area of iron of the stator adjacent the iron of the rotor, is variable, and the electric and magnetic characteristics of the arrangement are not uniform but subject to rapid fluctuation. These characteristics tend to reduce the transmission accuracy and to disturb the uniformity of the indications.

One of the objects of the present invention is to provide a novel winding arrangement for the creation of a uniform rotating field for receivers of an electric remote transmission system by means of electric impulses.

Another object of the invention is to provide a novel coil arrangement for an electric motor wherein magnetic losses are reduced to a minimum.

A still further object is to provide a novel winding for an electric remote transmission system which will increase the accuracy of the reproduction of a transmitted value.

An additional object is to provide a novel winding arrangement which enables the creation of a rotatable field wherein the fluctuation of magnetic effects is reduced to a minimum.

Another object is to provide a novel winding arrangement wherein the wires of different coils are spatially distributed in such a manner that they exercise equal magnetic influences.

Another object is to provide a novel winding arrangement for creating a uniform rotating field for a receiver of an electric remote transmission system whereby a constant torque is exerted upon the rotor of said receiver as it follows a transmitter through 360°.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Fig. 1 is a perspective view of a stator and winding illustrating one embodiment of the invention;

Fig. 2 is a plan view of an arrangement of wires in accordance with a second embodiment of the invention;

Fig. 3 is a side elevation of a stator and windings therefor which may be employed in the present invention;

Fig. 4 is a detail sectional view, with parts broken away, of a slotted stator having coils therein arranged in accordance with the invention;

Fig. 5 is a development of a winding which may be employed in the stator of Fig. 3;

Fig. 6 is a development of the surface of a rotor having slots therein arranged in accordance with another embodiment of the invention;

Fig. 7 is a development of the surface of a rotor having slots therein arranged in accordance with another emobdiment of the invention;

Figure 8:
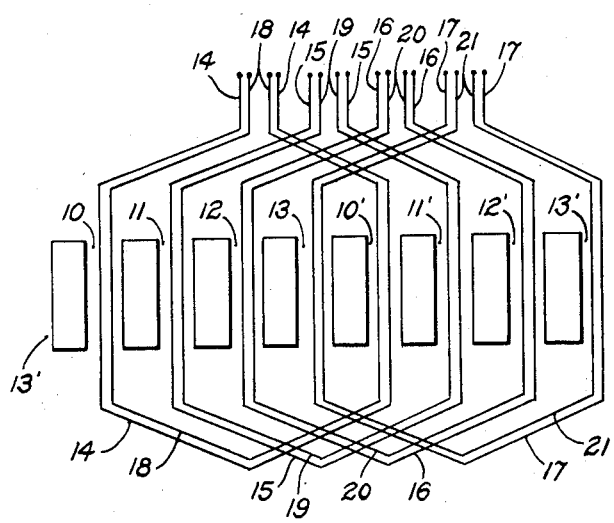
Fig. 8 is a development of an inside surface of the stator shown in Fig. 1, illustrating the manner in which the four sets of coils are arranged in the slots.

The forms of the invention illustrated in the accompanying drawings, by way of example, comprise novel arrangements of the windings and winding slots which may be employed in connection with rotating field receivers for electric remote transmission systems, the receiver having suitable slots in the rotor or stator thereof. Two or more windings are placed in said slots, each winding having two or more coil turns constituted by one or more turns of wire. The wire of each coil turn of one winding is in contact along the length thereof, but electrically insulated therefrom, with the wire of each coil turn of the other windings which lies in the same slots. This lengthwise contact may be accomplished by either initially twisting the wires together about a feed spool from which the coils are then wound about a core either by hand or machine or by binding the wires together adjacent one another in a parallel relationship. In order to obtain a uniform iron circuit, the slots of either the stator or the rotor are skewed or twisted over a substantial proportion of the circumference of the slotted member.

The windings for the creation of the rotating field can be arranged either on the rotor or the stator of a transmission system of the above character. It is preferable, however, to arrange the windings upon the stator. In the forms shown, in association with a stator are two windings, the magnetic vectors of which are displaced relative to one another by 90°, thus forming a cross-coil system. From a transmitter (not shown) current impulses pass to these windings, which with reference to their intensity or temporal duration are related to one another in the proportion of the sine to the cosine of an angle $\alpha$ which is to be transmitted. The resulting magnetic field formed by the two components in the receiver possesses at all times the direction of angle $\alpha$, and a receiver rotor, which may be constituted by a magnetic needle or an electromagnet, tends to coincide in its position with the direction of said field.

In the form shown in Fig. 1, a stator 9 having eight slots 10, 11, 12, 13 and 10', 11', 12', 13' is provided with a winding I, the coil turns of which have wires which for the sake of clarity are illustrated with black cross-sectional areas, and a winding II, the coil turns of which have wires of a white cross-sectional area, said wires being suitably covered with electric insulation. In order to obtain the greatest possible uniformity of magnetic effect of the coils of the separate windings, it is necessary that the wires of different coil turns lying in the same slots be spatially distributed to create equal magnetic effects. This is accomplished in this embodiment by twisting the wire of each coil turn of one winding with the wire of other coil turns of other windings which lie in the same slots. Each winding is distributed equally over the eight slots so that if each coil of each winding is wound from one slot to the opposite slot, thus constituting the arrangement a full pitch winding, each winding will contain four coils. For purposes of illustration, each coil is shown as having but one wire, the coils of winding I being constituted by wires 14, 15, 16, 17 and those of winding II being constituted by wires 18, 19, 20, 21. The wires of the former group, as above mentioned, are twisted with those of the latter group respectively, and the coils of each winding are interconnected in a manner analogous to a connection to be later explained, winding I being provided with terminals 22, 23 and winding II with terminals 24, 25. Corresponding terminals of the two windings are connected to coils which are angularly separated by 90° in order that the vectors of each winding may combine in a desired manner.

The coils of winding I create four magnetic fields $f_1$, $f_2$, $f_3$ and $f_4$ which combine to form a resultant magnetic field $M_1$. Since the terminals of winding II are connected to coils which are angularly separated from those of the winding I by 90°, a magnetic field $M_2$, created by the four coils of the former, is displaced 90° from $M_1$. The components of the field $M_2$ are not shown. The fields $M_1$ and $M_2$ combine to form a resultant field $M_r$, which acts upon a rotor (not shown) to cause same to assume the direction of field $M_r$.

Instead of twisting together the wires which comprise each coil of the separate windings, it may be desirable to secure the wires of each coil turn in a parallel relation as shown in Fig. 2, the wires being held adjacent one another by suitable binding strips 26 distributed at predetermined intervals along the length thereof, or a covering (not shown) for the full length of the wires may be employed. After the wires are so bound, the positioning of the coils of each winding may be accomplished as described above. Of course, it is also possible to wind the wires of each coil in a parallel relation as shown in Fig. 2, without using binding strips or a covering. However, this will, as a rule be difficult to perform.

Referring now to Fig. 8, the wires forming the first set of coils 14, 18 are first twisted together as shown in Fig. 1 or are enclosed in a cover as shown in Fig. 2 and are then wound so that the coils 14, 18 first enter slot 10 from the top as shown in Fig. 8 and then enter slot 10' from the bottom and emerges from said slot 10' at the top. The coils 15, 19 and 16, 20 and 17, 21 are similarly twisted and are wound so that coils 15, 19 are disposed in slots 11 and 11', coils 16, 20 in slots 12 and 12', and coils 17, 21 in slots 13 and 13' as shown.

Figure 9:
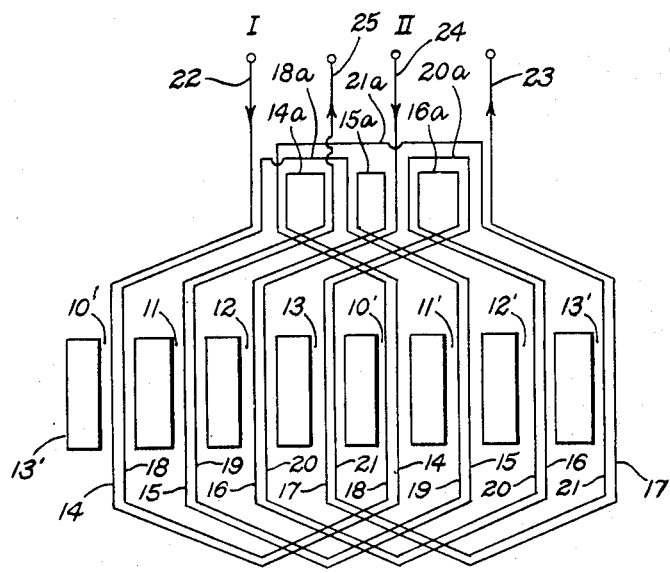
Fig. 9 is a developed view similar to Fig. 8 but shows the manner in which the sets of coils are interconnected to form two windings in two-phased relation.

Referring now to Fig. 9, the four sets of coils are interconnected to form the windings I and II as follows:

One end of coil 18 is connected to one end of coil 19 by lead 18a. The other end of coil 18 is connected to one end of coil 21 by lead 21a. One end of coil 14 is connected to a terminal lead 22 and the other end is connected to one end of coil 15 by lead 14a, the other end of coil 15 being connected to one end of coil 16 by lead 15a. The other end of coil 16 is connected to one end of coil 17 by lead 16a, and the other end of coil 17 is connected to a terminal lead 23. Thus winding I compromises the terminal lead 22, coils 14, 15, 16, 17 and terminal lead 23.

A terminal lead 24 is connected to one end of coil 20 and the other end of said coil 20 is connected to one end of coil 21 by lead 20a, the other end of said coil 21 being connected to coil 18 by lead 21a as previously stated. The remaining end of coil 19 is connected to a terminal lead 25. Accordingly, winding II comprises terminal lead 24, coils 20, 21, 18, 19 and terminal lead 25. It will be noted that coils 14, 15, 16 and 17 of winding I are respectively displaced 90° with respect to coils 20, 21, 18 and 19 of winding II.

The connections of the coils lying in the various slots are illustrated in Fig. 3 which shows a stator 27 wound in accordance with the invention. A plane development of the windings with connecting leads is shown in Fig. 5. In Fig. 3 the stator 27 is provided with sixteen slots 28 to 35, inclusive, and 28' to 35', inclusive. A full pitch winding, for example, is shown, consequently each two opposing slots, as 28 and 28', contain two coils, one of which is a part of winding I and the other a part of winding II. For purposes of illustration, the cross-sections of the coils in the slots of stator 27 are shown by hatching; however, the even and uniform distribution of the two windings in the slots is illustrated by a detail view of a single slot of the stator as shown in Fig. 4. The wire turns of the two coils which fill each slot of stator 27 may be either twisted together or joined in a parallel relation as above described.

In the plane development of the windings as shown in Fig. 5 are coils 36 to 43, inclusive, of winding I, and coils 36' to 43', inclusive, of winding II. Coils 36 to 43 are interconnected by leads 44; however, a current lead-in 45 is provided at coil 36 and a current lead-off 46 at coil 43. Ninety degrees separated from the two terminals 45, 46 are suitable terminals 47, 48, respectively, connected to coils 39' and 40', the former terminal being a current lead-off and the latter a lead-in. Coils 36' to 39' are successively interconnected by leads 49, coils 40' to 43' by leads 50, and the two coils 43' and 36' by a lead 51.

The magnetic vectors of the coils 36 to 43 produce a resultant field $m_1$ and the vectors of coils 36' to 43' produce a resultant field $m_2$ in a manner analogous to that above set forth. When making the winding, it is of course necessary to place the wires in the correct direction in order to avoid a condition wherein the magnetic fields of one winding weaken the fields of another winding.

If it is intended to create a rotating field by means of phase displaced alternating currents, for example, three phase current, the slots of a stator and rotor may be arranged axially. However, if the rotating field is created by means of current impulses, as in the case under consideration in the present invention, the impulses by their total effect creating sinusoidal currents in the various coils, then there will occur between the poles of the rotor and stator the phenomenon known as the "rest" or "stop" or "slot" effect. In order to reduce this effect, it has been heretofore proposed to skew or twist the rotor and stator slots relative to one another to the extent of one half of a slot.

However, in transmitter devices with rotating field receivers of the type herein described, a very intense "fourth harmonic error curve" occurs in spite of a skewing of the slots to this extent. This is explained by the fact that in connection with normally skewed stators and rotors, the iron circuit between stator and rotor is too irregular so that the torque which acts in controlling the rotor is not equally strong in every angular position thereof. As compared with other remote transmission devices with receiver windings in accordance with a pole shoe system, it should be observed that in the present invention the various receiver windings form ring field systems and the poles are created by the resultant effect of the entire ring field system. In the present invention, it is proposed to skew the stator and rotor slots in such a manner that the most uniform and even iron circuit is obtained along the entire circumference of the rotor and stator. Consequently, skewing said slots to the extent of one-half of a slot is insufficient. The skewing should extend over a considerable portion of the stator or rotor circumference so that, if possible, all the slots are employed for the creation of the resulting rotating field. It is advisable, to cause the slots of the stator to extend in the axial direction or to skew the same to a slight extent and to skew the slots of the rotor.

If it is assumed that the rotating field is created with the stator and that the rotor is bipolar, a total skewing of, for example, the rotor slots to the extent of about one-third of the circumference thereof will substantially eliminate the above mentioned disadvantage. In Fig. 6 a development of the external surface of a rotor of this character is shown with the slots thereof skewed to the extent of one-third of the circumference, i. e. by 120°. The rotor is provided with eight slots, the pitch of the slots therefore amounts to 45°. In the slots is arranged a winding traversed by direct current and which producing the two magnetic poles spaced from each other by 180°. It is also advisable to skew by a slight amount the slots of the stator, for example, to the extent of one half a slot as shown in dotted lines, i. e. by 22.5°.

In Fig. 7 a development of a four-pole rotor is shown having a skewing of the slots to the extent of one-sixth of the circumference of the rotor, i. e. the slots are skewed 60°. The slots are provided with two windings displaced with respect to each other 90°, so as to result in a four-pole rotor.

Figure 11:
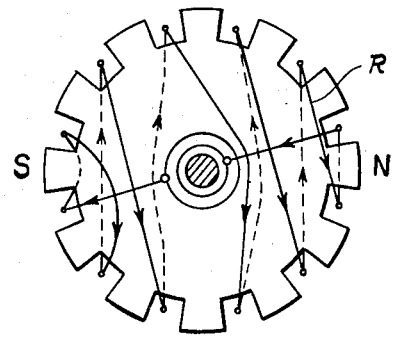
Fig. 11 shows one form of rotor and rotor winding used with the stator of Fig. 1.
Figure 10:
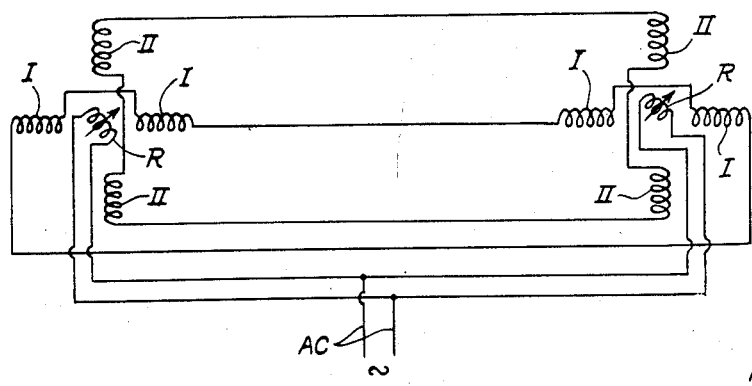
Fig. 10 is a wiring diagram showing one form of circuit connecting together two motors embodying the invention.

In Fig. 10 is shown a wiring diagram of one form of circuit connecting together two motors having stators of the type shown either in Fig. 1 or Fig. 3. The rotors of said motors may be of the type shown in Fig. 11. Either motor may be the transmitter and then the other motor will be the receiver. The stator winding I of one motor is connected to the stator winding of the other motor and likewise the winding II of the stator of one motor is connected to the winding II of the stator of the other motor. The rotor of each motor comprises a single phase winding R and the two windings are connected together and then to a source of alternating current represented by the leads AC for energization thereby. If the rotor of one motor is displaced angularly the rotor of the other motor will be displaced the same amount by the reaction between the field of its winding and the resultant field of the windings I and II of its associated stator, in the same manner as the rotors are displaced in the system shown in the patent to Reichel et al. No. 2,038,059, dated April 21, 1936.

There is thus provided a novel arrangement of the coils, and a novel disposition of the slots for said coils in an electric motor of the above character. More uniform magnetic and electrical effects are obtained, a highly uniform iron circuit between rotor and stator is achieved, and "slot" or "stop" effect is substantially eliminated. The coil arrangements are simple and easily executed, and the means for obtaining a uniform iron circuit and for reducing slot effect are easily adapted for large scale production at low cost.

Although only five embodiments of the present invention are illustrated and described in detail, it is to be expressly understood that the same is not limited thereto. For example, the invention has been applied to a rotating field receiver with two windings displaced to the extent of 90° relative to one another, the branch currents of which are in the same relation to each other as the sine and the cosine of an angle which is to be transmitted. However, the inventive idea is applicable wherever the individual windings of the receiver, which windings provide the exciting field, are to be symmetrical with reference to their magnetic effects. It is to be further understood that in the claims, where mention is made of a "motor member," either a rotor or a stator is referred to.

What is claimed is:

1. In apparatus of the class described, a stator member, a rotor member, said stator and rotor members having slots therein, and two or more windings in the slots of one of said members, each winding comprising a plurality of coil turns of wire, the wire of each coil turn of one winding being insulated from and secured along the length thereof with the wire of each coil turn of the other windings which lies in the same slots.

2. In apparatus of the class described, a stator member, a rotor member, said members having slots therein, and two or more windings in the slots of one of said members, each winding comprising two or more coil turns of wire, the wire of each coil turn of one winding being insulated from and twisted with the wire of each coil of the other windings which lies in the same slot.

3. In apparatus of the class described, a stator member, a rotor member, said stator and rotor members having slots therein, and two or more windings in the slots of one of said members, each winding being constituted by one or more wires, the wires of one of said windings being twisted with the wires of other windings lying in the same slots.

4. In apparatus of the class described comprising, in combination with a motor member having slots therein, two or more windings for creating a rotary field by means of electrical impulses, said windings having the magnetic vectors thereof angularly disposed, each winding comprising a plurality of coil turns of wire, the wire of each coil turn being twisted with the wire of each of the other coil turns lying in the same slot.

5. In apparatus of the class described, a stator member, a rotor member, said rotor and stator members having slots therein which are skewed relative to one another by an amount which is proportional to the circumference of the members, and two or more windings in the slots of one of said members, the wire of each winding being insulated from and secured along the length thereof with the wire of each other winding.

6. In apparatus of the class described, a motor member having slots therein, two or more windings in said slots, the wire of each winding being in contact along the length thereof with the wire of each other winding, and binding strips for binding the wires in such contact.

7. In apparatus of the class described, a bipolar motor member having slots therein, the slots being skewed to the extent of one-third of the circumference of the member, and two or more windings in said slots having the magnetic vectors thereof angularly disposed in a predetermined relation, each winding comprising a plurality of coil turns of wire, the wire of each coil turn being insulated from and secured along the length thereof with the wire of each of the other coil turns lying in the same slot.

8. In apparatus of the class described, a four-pole motor member having slots therein, the slots being skewed to the extent of one-sixth of the circumference of the member, and two or more windings in said slots, each winding comprising a plurality of coil turns of wire, the wire of each coil turn of one winding being insulated from and secured along the length thereof with the wire of each coil turn of the other windings which lies in the same slot.

RUDOLF NEUMEISTER.
HEINZ GROSSHANS.